United States Patent [19]

Lin

[11] Patent Number: 5,526,661
[45] Date of Patent: Jun. 18, 1996

[54] QUICK-RELEASE HOLDING DOWN DEVICE FOR BICYCLE

[76] Inventor: Joy Lin, No. 106, Alley 15, Lun Ya Lane, Lun Ya Li, Yuanlin Chen, Changhwa Hsien, Taiwan

[21] Appl. No.: 350,073

[22] Filed: Nov. 29, 1994

[51] Int. Cl.[6] .............................. B62H 5/00; E05B 71/00; F16B 19/00
[52] U.S. Cl. ................... 70/233; 70/213; 411/354; 301/110.5
[58] Field of Search .................. 411/354; 70/19, 70/205, 213, 225, 233; 301/110.5

[56] References Cited

U.S. PATENT DOCUMENTS

| | | | |
|---|---|---|---|
| 1,834,091 | 12/1931 | Cruse | 70/213 X |
| 4,724,692 | 2/1988 | Turin et al. | 70/233 X |
| 4,763,957 | 8/1988 | Poehlmann et al. | 411/354 X |
| 4,972,691 | 11/1990 | Knight | 70/213 X |
| 5,027,628 | 7/1991 | De Rocher et al. | 70/233 |
| 5,257,855 | 11/1993 | Nagano | 411/354 |

*Primary Examiner*—Neill R. Wilson
*Attorney, Agent, or Firm*—Varndell Legal Group

[57] ABSTRACT

A holding down device including a headed screw rod, which is inserted through the device to be held down and then a nut is screwed thereon. A lever is pivoted to the head of the headed screw rod. The lever has a headed lock bar controlled by a combination lock arranged in the lever to prevent the lever from turning about the pivot when the numbers in the lock are incorrect.

1 Claim, 6 Drawing Sheets

QUICK-RELEASE HOLDING DOWN DEVICE FOR BICYCLE

BACKGROUND AND SUMMARY OF THE INVENTION

FIGS. 1 and 2 show a quick-release holding down device used in a bicycle for holding a part of the bicycle in place. The quick-release holding down device comprises a lever, a bolt, a screw rod, a notched block, a packing plate, a spring, and a nut. The lever has a front opening. The bolt has a screw hole and is secured to the lever and disposed inside the front opening. The screw rod has one end inserted through the front opening of the lever and threaded into the screw hole on the bolt, and an opposite end inserted through the notched block, the packing plate, the spring, and the device to be held down, and then threaded into The screw hole on the nut. The screw bolt can be driven into or out of the screw hole on the nut by the lever. When installed, the lever is turned about the bolt and stopped against a notch on the notched block. This structure of a quick-release holding down device is still not satisfactory in function, because the lever may be turned by error to loosen the screw rod from the nut, causing the device being held down to disconnect from position.

The present invention has been accomplished to provide a quick-release holding down device which eliminates the aforesaid problem. According to the preferred embodiment of the present invention, the quick-release holding down device comprises a headed screw rod, which is inserted through the device to be held down and then screwed up with a nut, a lever is turned about a pivot on the head of the headed screw rod, and a headed lock bar controlled by a combination lock provided in the lever for preventing the lever from turning about the pivot when the numbers in the lock are incorrect.

DETAILED DESCRIPTION OF THE PREFERRED EMBODIMENT

Figure 1:
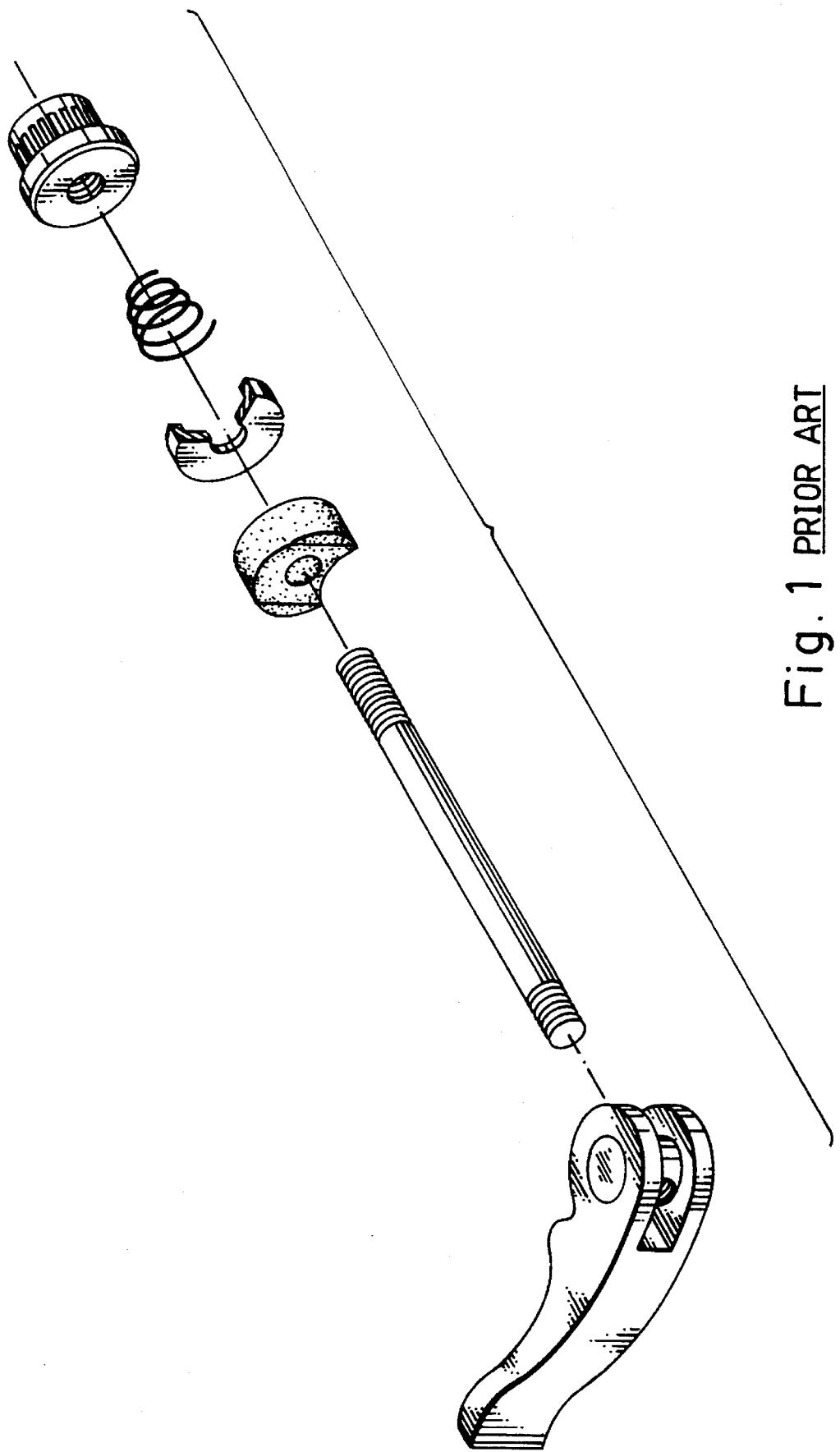
FIG. 1 is an exploded view of a quick-release holding down device according to the prior art.
Figure 2:
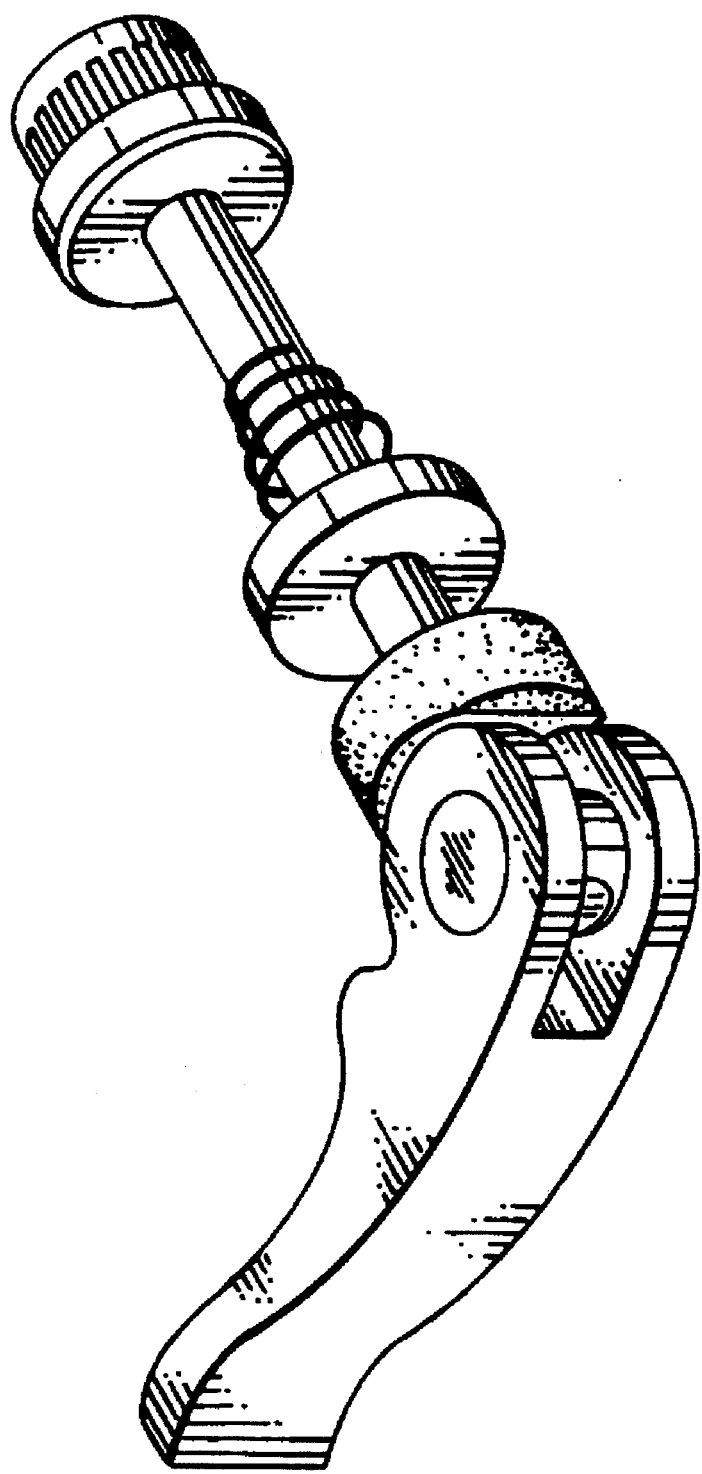
FIG. 2 is an elevational view of the quick-release holding down device of FIG. 1.
Figure 3:
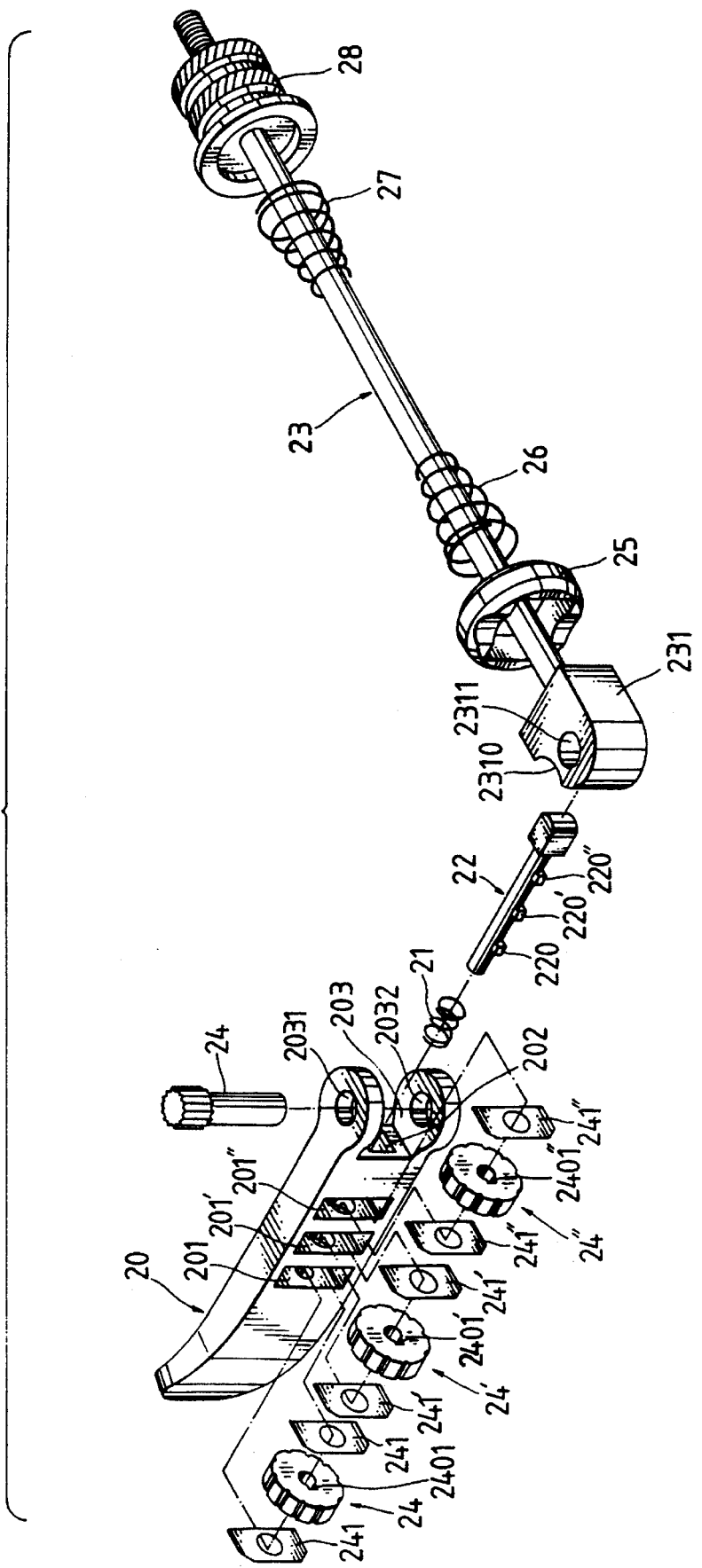
FIG. 3 is an exploded view of a quick-release holding down device according to the present invention.
Figure 4:
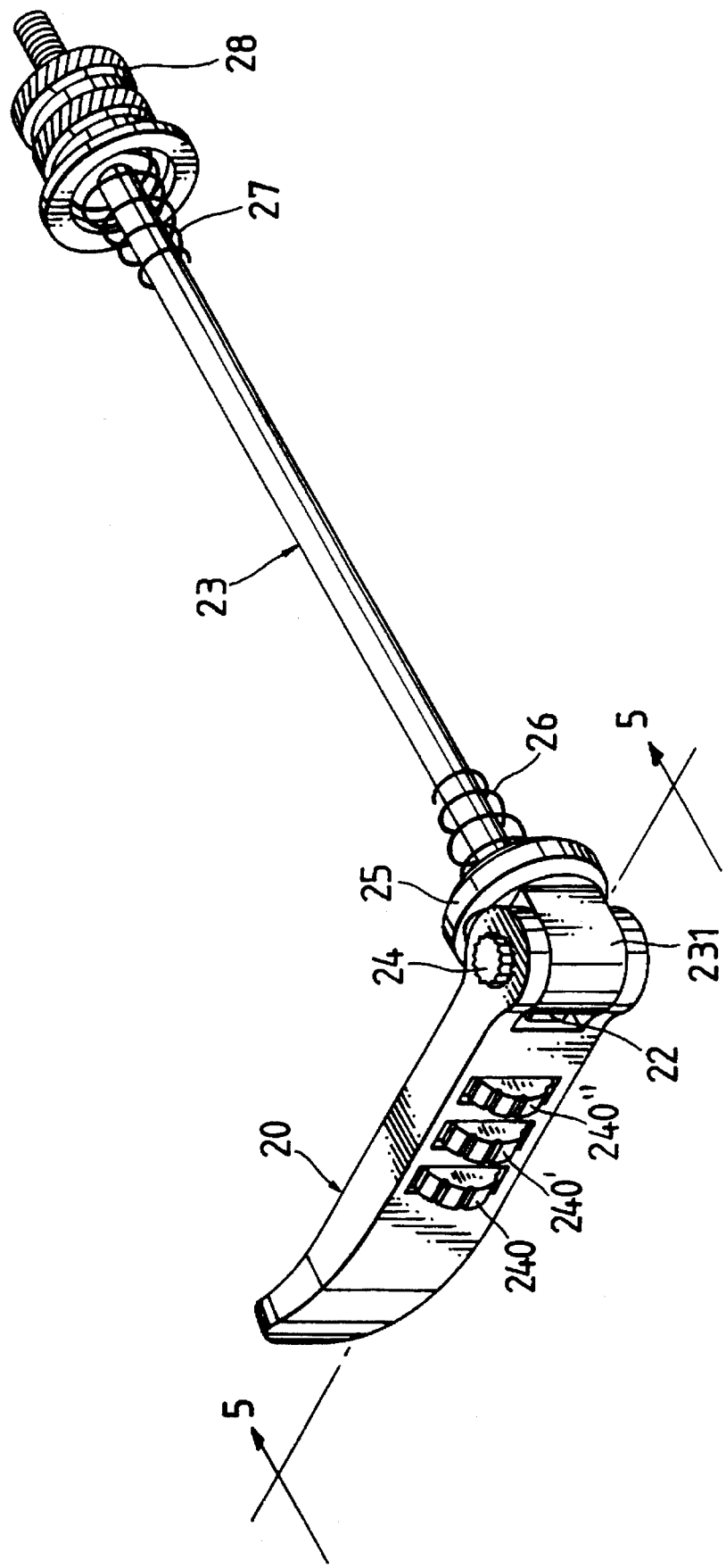
FIG. 4 is an elevational view of the quick-release holding down device of FIG. 3.
Figure 5:
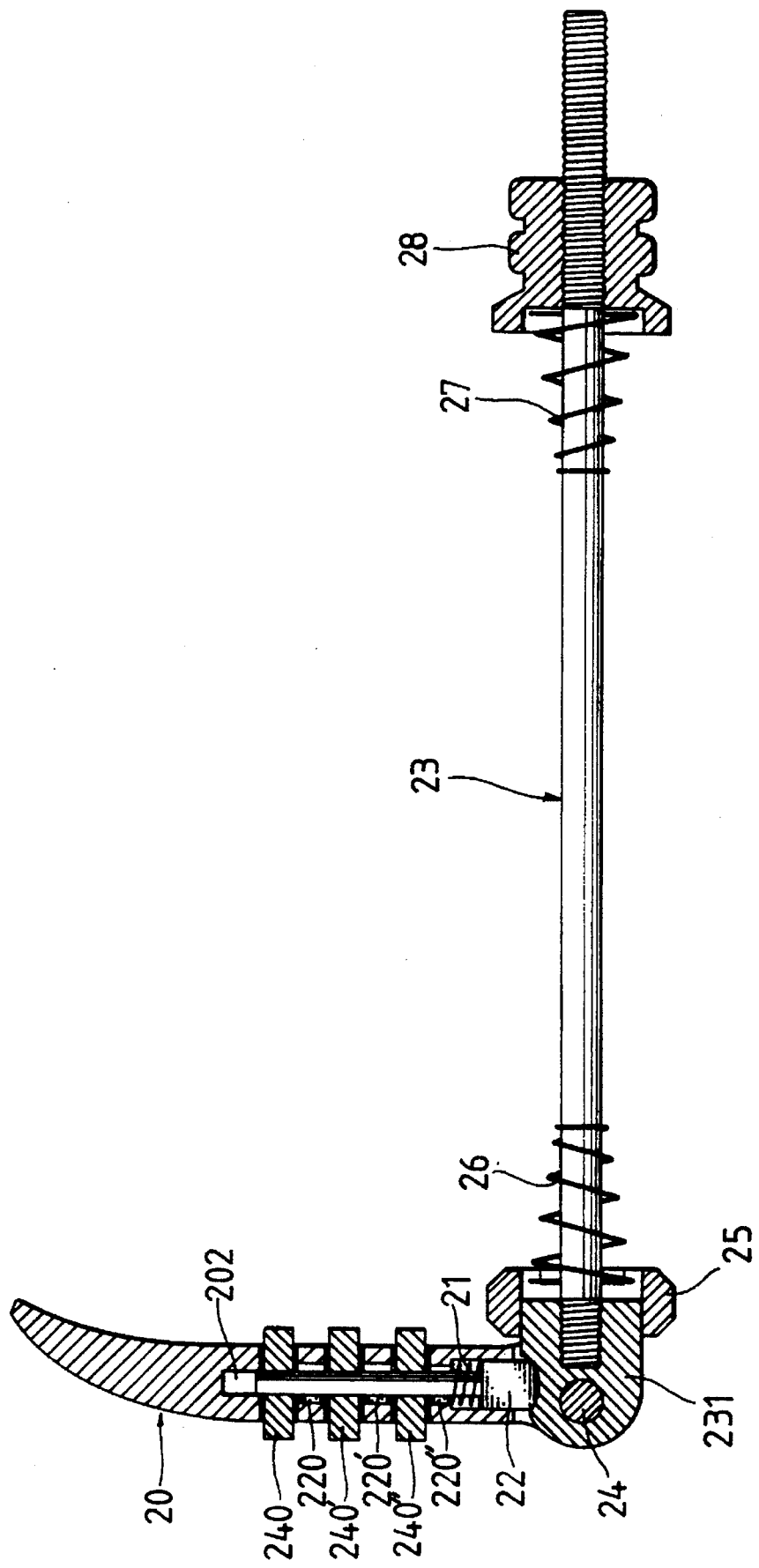
FIG. 5 is a sectional view taken along line 5—5 of FIG. 4.
Figure 6:
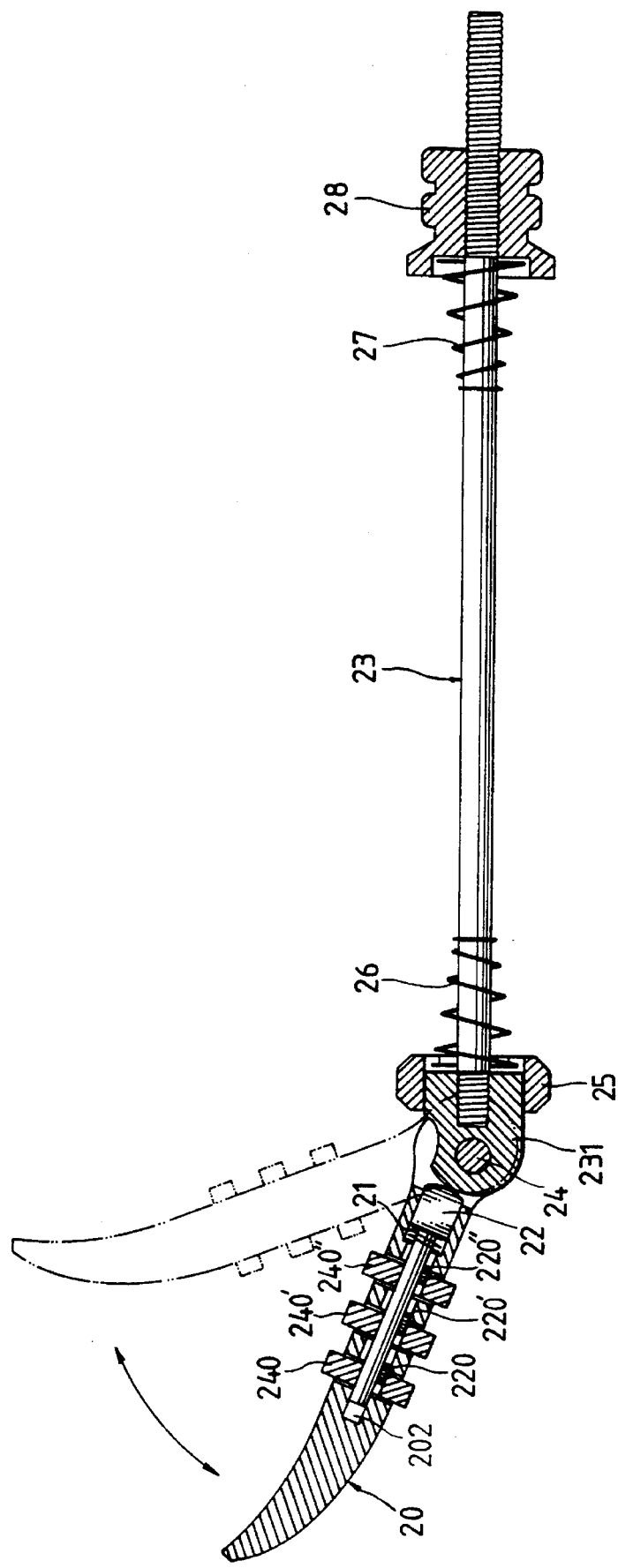
FIG. 6 shows the moving direction of the lever of the quick-release holding down device of FIG. 5.

Referring to FIGS. 3 through 6, the invention includes a holding down device, comprises a lever 20, a spring 21, a headed lock bar 22, a screw rod 23, and a plurality of wheel and locking plate sets 24, 24', and 24".

The lever 20 comprises a plurality of chambers 201, 201', and 201" spaced in the longitudinal direction, which receive the wheel and locking plate sets 24, 24', and 24" respectively, a longitudinal hole 202 extended through the chambers 201, 201', and 201", two eyed lugs 2031 and 2032 at one end, and an opening 203 defined between the eyed lugs 2031 and 2032 that communicates the longitudinal hole 202.

A spring 21 is mounted around the headed lock bar 22 and received inside the longitudinal hole 202. The spring 21 has one end abutting a stepped inside wall of the longitudinal hole 202 and an opposite end abutting the head of the headed lock bar 22 for providing an outward force or bias to the head of the headed lock bar 22.

The headed lock bar 22 is inserted through the spring 21 into the longitudinal hole 202 of the lever 20. The headed lock bar 22 has a plurality of projecting blocks 220, 220', and 220" spaced in the longitudinal direction.

The screw rod 23 has a locating block 231 secured at one end thereof. The locating block 231 of the screw rod 23 has a pivot hole 2311 pivotably connected between the two eyed lugs 2031 and 2032 of the lever 20 by a pivot 24 passing therethrough, and a side notch 2310, which receives the head of the headed lock bar 22.

The wheel and lock plate sets 24, 24', and 24" are comprised of number wheels 240, 240', and 240", and washers 241, 241', and 241", respectively mounted around the headed lock bolt 22 and received in the chambers 201, 201' and 201", each having a respective notch 2401, 2401', or 2401'. When the notches 2401, 2401', and 2401" are aligned, the headed lock bar 22 can be moved longitudinally relative to the number wheels 240, 240', and 240". If the notches 2401, 2401', and 2401" are not aligned, the projecting blocks 220, 220', and 220" are respectively stopped by the number wheels 240, 240', and 240", and the lever 20 is stopped by the lock bar 22 from turning about the pivot 24.

When in use, the screw rod 23 is inserted in proper order through a cup 25, a left-side spring 26, the device to be held down, and a right-side spring 27, and then threaded into a nut 28. By means of turning the number wheels 240, 240', and 240" to align the notches 2401, 2401', and 2401", the lever 20 can be unlocked from the headed lock bar 22.

I claim:

1. A quick-release holding down device comprising:

a screw rod having one end terminating in a locating block and an opposite end respectively inserted through a cup, a first spring and a device to be held down, and then threaded into a nut and a tightened up, said locating block having a pivot hole and a notch;

a lever having two eyed lugs at one end pivotally connected by a pivot to two opposite ends of said pivot hole on said locating block of said screw rod, a longitudinal series of chambers, and a longitudinal locating hole extended through said chambers, said lever turned about said pivot for clamping said screw bolt and said bolt in a desired position and for unclamping said screw and bolt;

a headed lock bar having an elongated body inserted into said longitudinal locating hole of said lever and a head received in said notch of said locating block of said screw rod, said elongated body having a longitudinal series of projecting blocks;

a second spring fastened to said longitudinal locating hole of said lever and abutting said head of said headed lock bar for forcing said head of said headed lock bar into said notch of said locating block of said screw rod and providing resistance against turning of said lever about said pivot; and a plurality of numbered wheels respectively mounted around said elongated body of said headed lock bar and received in said chambers of said lever, a pair of washers arranged on both sides of each said numbered wheel, and each said numbered wheel having a notch matching a respective projecting block of said series of projecting blocks of said elongated body; so that when said plurality of numbered wheels is correctly aligned with said series of projecting blocks, said headed lock bar can pass thereby and said lever can turn about said pivot; and so that when said plurality of numbered wheels is incorrectly aligned with said series of projecting blocks, said headed lock bar cannot pass thereby and said lever cannot turn about said pivot.

* * * * *